United States Patent [19]

Noguchi

[11] Patent Number: 5,532,778
[45] Date of Patent: Jul. 2, 1996

[54] CAMERA WITH ADJUSTABLE VIEWFINDER

[75] Inventor: Yukio Noguchi, Saitama-ken, Japan

[73] Assignees: Fuji Photo Optical Co., Ltd., Saitama-ken; Fuji Photo Film Co., Ltd., Kanagawa-ken, both of Japan

[21] Appl. No.: 218,377

[22] Filed: Mar. 28, 1994

[30] Foreign Application Priority Data

Mar. 26, 1993 [JP] Japan ................................. 5-092333
Mar. 26, 1993 [JP] Japan ................................. 5-092334

[51] Int. Cl.[6] ................................................. G03B 13/14
[52] U.S. Cl. ................................................... 354/221
[58] Field of Search ................................. 354/219, 221, 354/222, 94, 159

[56] References Cited

U.S. PATENT DOCUMENTS

| | | | |
|---|---|---|---|
| Re. 32,797 | 12/1988 | Harvey | 354/195.1 |
| 4,336,985 | 6/1982 | Iwata et al. | 351/145 |
| 4,831,399 | 5/1989 | Tsurukawa et al. | 354/221 |
| 4,887,109 | 12/1989 | Fujita et al. | 354/222 |
| 5,021,815 | 6/1991 | Harvey | 354/222 |
| 5,066,971 | 11/1991 | Kodaira | 354/465 |
| 5,115,267 | 5/1992 | Kondo et al. | 354/221 |
| 5,160,954 | 11/1992 | Suzuki et al. | 354/221 |
| 5,216,457 | 6/1993 | Yamaguchi et al. | 354/221 |
| 5,345,285 | 9/1994 | Hasushita et al. | 354/159 |

Primary Examiner—Michael L. Gellner
Assistant Examiner—N. Tuccillo
Attorney, Agent, or Firm—Young & Thompson

[57] ABSTRACT

A finder structure for a camera, in which the finder is divided into an objective block and an eyepiece block. The housings of these blocks are removably connected with each other, thereby allowing one of the housings to move with respect to the other housing in a direction transversely of the optical axis of the finder to correct parallax. The structure comprises in the finder, a field frame plate, panoramic field frame members defining panoramic field frames, and a field frame changeover lever which engages with the panoramic field frame members. A shaft of the field frame changeover lever is rotatably received in an opening formed in the housing of the finder to engage with a finder drive lever disposed outside the finder, allowing the finder drive lever to be linked to a photography mode changeover lever to slide the panoramic field frame members by operation of the photography mode changeover lever. The finder is incorporated in the camera body by mounting either one of the objective block or the eyepiece block on the camera body, and connecting the other block (not mounted on the camera body) to the block mounted to the body with locking screws or the like. Parallax is corrected by loosening the locking screws to move the block not mounted on the camera body relative to the block mounted on the camera body.

2 Claims, 2 Drawing Sheets

CAMERA WITH ADJUSTABLE VIEWFINDER

This application is based on Japanese patent applications Nos. 1993-92333 and 1993-92334, both filed Mar. 26, 1993. The entirety of these applications is hereby expressly incorporated by reference.

BACKGROUND OF THE INVENTION

1. Technical Field

The present invention relates to a camera viewfinder structure which allows easy correction of parallax in a real image viewfinder, and to a viewfinder structure for use in a panoramic camera which is shiftable between a normal or full-frame mode of photography and a panoramic mode of photography.

2. Prior Art

Various cameras are available which employ, to simplify photographing, vari-focal devices that allow alteration of the focal length of a taking lens or zooming, an automatic focusing device which enables the taking lens to be focused on a subject by turning the lens toward the subject and pressing a shutter button half way, and a panoramic function which allows switching between normal or full-frame photography, in which the film frame measures 36 mm ×24 mm, and panoramic photography, in which the film frame measures 36 mm×16 mm. Particularly, so-called direct viewfinder cameras have been widely used. In such cameras, however, unlike the so-called single lens reflex cameras, parallax is produced between the taking optical system and the finder optical system.

In assembling such direct viewfinder cameras, parallax correction is performed on the viewfinder with respect to the subject (test chart) positioned at a predetermined distance so that parallax should not arise.

However, in manufacturing component parts of a camera body and finder, it is possible that manufacturing errors occur. Due to these errors, the amount of parallax may vary among individual cameras even when parallax correction as described above is carried out.

OBJECTS OF THE INVENTION

It is therefore a first object of the present invention to provide a camera viewfinder structure which allows correction of parallax variations, arising from errors in the manufacture of component parts of viewfinders, in individual cameras.

In a popular, direct viewfinder camera with panoramic photograph capability, employing the above-described finder optical system, the angle of view of the taking optical system in the normal photography mode is different from the angle of view in the panoramic photography mode and hence the field of view is also different. It is therefore necessary to alter the field of view of the finder optical system in correspondence therewith.

Hitherto, a field frame for normal photography and a field frame for panoramic photography have been previously formed on a field frame plate. In changing these field frames in the viewfinder in accordance with a particular angle of view in such a panoramic camera, the photographer is obliged to select one field frame or the other, whichever is suitable for the desired photography mode.

However, in such finders in which the photographer selects either a normal photography field frame or a panoramic field frame formed on the field frame plate, it is necessary to check the photography mode each time a photograph is taken. When the object to be photographed is a moving one, the photographer may shoot without checking the photography mode since he has only a brief chance to press the shutter, and this may lead to failure to take a desired photograph. It may also happen that he forgets to check the photography mode when there has been a relatively long time between a new shooting and the previous shooting, resulting in failure to produce a desired photograph. Accordingly, a viewfinder is desirable which allows switching from a field frame for a normal photography mode to a field frame for a panoramic photography mode, or vice versa, in correspondence with the photography mode selected.

A so-called real image type viewfinder is often used, because the field frame can be defined and made clear by placing it on a real image area. In this real image type finder, an inverted real image produced by an objective lens and imaged onto the field frame is converted into an erected image by an erecting prism or the like, whereafter this image may be viewed through an eyepiece on a magnified scale. Accordingly, dust and the like which has adhered to the surface defining the focal plane may also be magnified and observed with the object, whereby observation of the object becomes difficult.

To provide a structure which allows switching between field frames, it is necessary to dispose in the finder interior a mechanism which moves the field frames in association with the change of photography mode. It will also become necessary to provide a transmission mechanism which transmits power from outside the finder to the moving mechanism. Since this transmission mechanism must extend internally and externally of the finder, openings need to be made in the finder housing for insertion of the transmission mechanism therethrough. When a large number of such openings are formed, dust will likely be introduced into the finder interior, resulting in frequent adherence of dust to the surface defining the focal plane.

It is therefore a second object of the present invention to provide a finder structure for a camera with a panoramic function, which allows switching of the field frames in accordance with the photography modes, and which keeps dust entering the finder interior to a minimum.

SUMMARY OF THE INVENTION

A camera viewfinder structure according to the present invention comprises a finder which allows observation of an object by an optical system, separate from the taking optical system of the camera, for determining the composition of the picture to be taken. This fielder is divided into at least an objective lens or forward block and an eyepiece or rearward block. The objective lens block is so constructed as to include at least an objective lens retained in an objective lens housing. The eyepiece block is so constructed as to include at least an eyepiece lens retained in an eyepiece housing. The objective lens housing and the eyepiece housing are releasably interconnected such that one of the housings is movable with respect to the other housing transversely to the optical axis of the finder.

There is also provided according to a second aspect of the invention a finder structure for a camera with a panoramic function which allows switching between a normal photography mode and a panoramic photography mode, the finder allowing observation of an object by a finder optical system, separate from the taking optical system, for determining the composition of the picture to be taken. In this finder structure, a field frame plate having formed thereon a normal field frame is disposed such that it faces the focal plane of the above-described finder optical system. The structure includes a pair of panoramic field frames, which are slidingly movable along the above-described field frame plate and which move into and out of the boundaries of the normal field frame, and which define a panoramic field frame when the pair slide toward each other. A field frame changeover lever having an engaging section which engages with the above-described panoramic field frames is rotatably mounted by its central shaft through an opening formed in a portion of the finder housing which accommodates the finder optical system. The shaft of the field frame changeover lever is linked to a finder drive mechanism, whereby the above described panoramic field frame members can be slid by operating the finder drive mechanism.

There is further provided according to a third aspect of the invention a finder structure for a camera with a panoramic photography function which allows switching between normal photography and panoramic photography, in which a finder of the structure allows observation of a subject with an optical system which is different from the photography optical system, in order to determine the composition of the picture to be taken. The finder is a real image type finder allowing observation of an erected non-reversed image of the object. The finder is divided into at least an objective or forward block and an eyepiece or rearward block. The objective block is so constructed as to include at least an objective lens retained in an objective housing. The eyepiece block is so constructed as to include at least an eyepiece lens in an eyepiece housing. In addition, an erecting optical system which converts an inverted real image into an erect image is disposed either in the objective block or in the eyepiece block, and the objective housing and the eyepiece housing are disengageable from each other. At the same time, one of the housings is made movable with respect to the other housing, in a direction transverse to the optical axis. Field frame plates carrying thereon normal field frames are disposed facing the focal plane of the finder optical system. The structure further includes a pair of panoramic field frame members, slidable along the above-described field frame plate and serving as panoramic field frames when they slide into and narrow the field of the above-described normal field frames. A field frame changeover lever has an engaging section which engages with the panoramic field frame members, and a shaft centrally of the lever which extends rotatably through an opening formed in the objective housing which accommodates the finder optical system, or an opening formed in the eyepiece housing, or an opening formed in a suitably-apertured partition therein. The shaft of the field frame changeover lever is engaged with a finder drive lever disposed e.g. outside the finder, and the finder drive lever is linked to a photography mode changeover lever which allows switching between a normal photography mode and a panoramic photography mode, such that the panoramic field frame members are slid by the operation of the photography mode changeover lever.

Also, in the finder structure, at least a portion of the objective lens is capable of moving in the direction of the optical axis, whose movement allows free alteration of the magnification of the finder. Otherwise, the objective lens and the eyepiece may respectively be fixedly mounted to make the finder magnification constant.

In assembling the finder to the camera body, one of the blocks (a so-called first block), either the objective block or the eyepiece block, is mounted on the camera body, and the other remaining block (a so-called second block) is connected to the other block using set screws and the like.

Parallax correction is carried out by loosening the set screws and moving the second block with respect to the first block. Since the housing of each of these blocks is movable in a direction orthogonal to the optical axis with respect to each other, changing the relative position of the housings changes the direction of the optical axis of the finder optical system. Accordingly, parallax between it and the photographic optical system may be corrected.

Operating the photography mode changeover lever rotates the finder drive lever linked thereto, whose rotation causes the field frame changeover lever to turn. Since the panoramic field frame members are engaged with the field frame changeover lever, the rotation of the field frame changeover lever causes the panoramic field frame members to slide. Accordingly, when the photography mode changeover lever switches from normal photography mode to panoramic photography mode, the panoramic field frame members move into the normal field frame and are superimposed on a portion of the normal field frame, so that the field frame is switched to a panoramic photography field frame. In switching the photography mode changeover lever to the normal photography mode, the panoramic field frame members withdraw from the normal field frame, so that the normal field frame is fully open, thereby switching the field frame to normal photography.

Operating the photography mode changeover lever switches the camera photography mode to either the normal photography mode or the panoramic photography mode. The switching of the photography mode may be performed either in accordance with mechanical structure or photographic information. More specifically, in switching based on the mechanical structure, a light-blocking plate provided in front of an aperture is rotated and a portion of the aperture is covered during panoramic photography to form a vertically shortened field, while during the normal photography, the plate moves away from the position where the aperture is covered, thereby allowing the aperture to be opened. On the other hand, in switching based on photographic information, the copying of the subject is followed by copying of the photographic information onto an appropriate portion of the film in accordance with the photographic mode, so that printing is carried out appropriately to normal photography or to panoramic photography in accordance with the photographic information.

DETAILED DESCRIPTION OF THE PREFERRED EMBODIMENT

A viewfinder structure for a camera according to the present invention will be described in detail with reference to an embodiment illustrated in the figures. In the present embodiment, this structure is embodied in a zoom finder in a camera with a zoom device.

Figure 1:
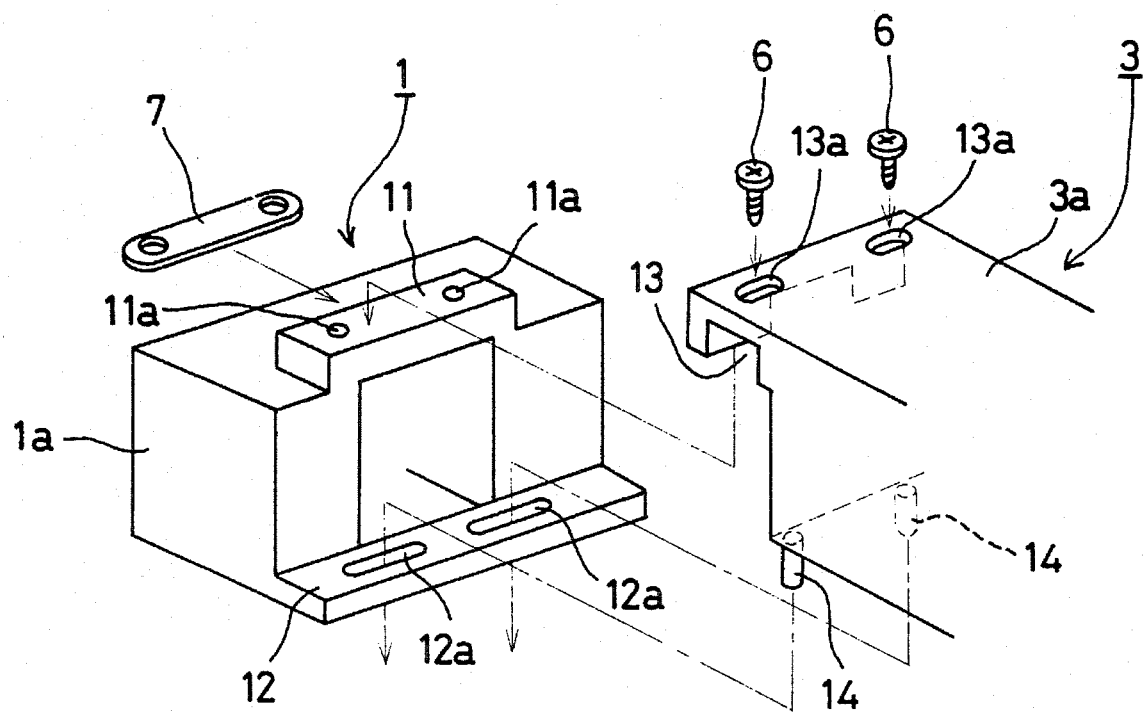
FIG. 1 is an exploded perspective view schematically illustrating a general view of a camera viewfinder structure according to the present invention, with some portions omitted for clarity.
Figure 2:
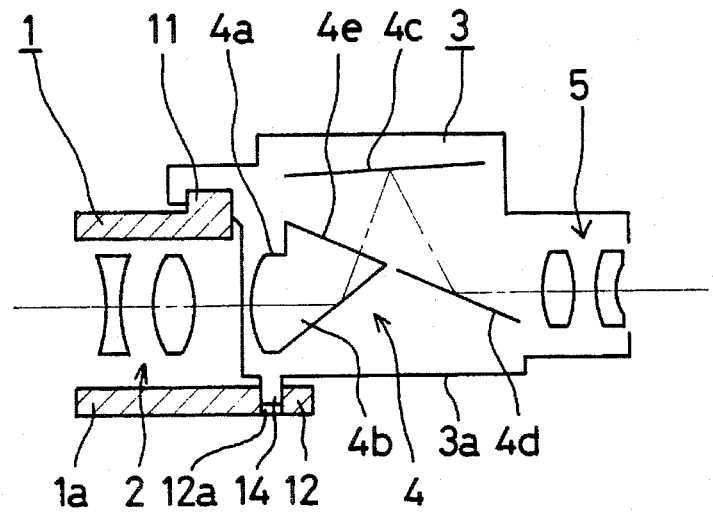
FIG. 2 is a cross section schematically illustrating the finder sectioned on a vertical plane including the optical axis.

FIG. 1 is a perspective view schematically showing the camera finder structure. An objective block 1 is mounted on a camera body. As shown in FIG. 2, the objective block 1 has an objective lens 2 retained in an objective housing 1a. At least a portion of the lens comprising the objective lens 2 interlocks with the zooming of the photographic lens (not illustrated) and moves in the direction of the optical axis, so that the magnification of the finder is changed. That is, a movable portion related to a magnifying changeover operation is accommodated in the objective block 1.

An eyepiece block 3 is connected to the rear end of the objective block 1. The eyepiece block 3 has an eyepiece housing which retains an erecting optical system 4 comprising a condenser lens 4a, a prism 4b, a roof mirror 4c and a mirror 4d, and an eyepiece 5. That is, the eyepiece block 3 has a fixed portion which is not affected by the magnifying changeover operation of the finder.

In this finder, the exit plane of the prism 4b is defined as a focal plane 4e, and field frames which will be described later are provided facing the focal plane 4e. In observing the object through the eyepiece, the object image, whose light has passed through the objective lens 2 and is focused on the focal plane 4e of the prism 4b, is appropriately enlarged by the eyepiece 5 for observation.

At the rear portion of the top surface of the objective housing 1a, there is formed an engaging projecting portion 11, which is of suitable horizontal length in the direction of the optical axis and suitable width in a direction orthogonal to the optical axis. At the bottom of the rear side of the objective housing 1a, there is formed a flange portion 12 which projects outwardly toward the rear. In the upper surface of the above-described engaging projecting portion 11, there are formed screw holes 11a which receive set screws 6. In the flange portion 12, there is provided a pair of slots 12a extending trasversely to the optical axis.

At the top front portion of the eyepiece housing 3a, the front end portion of a tongue which projects out toward the front extends downward by an appropriate length, so that an engaging recess 13 is formed between the front end portion of the tongue and the rest of housing 3a. At the bottom front portion of the eyepiece housing 3a, a pair of downwardly extending engaging pins 14 is provided. To connect the objective block 1 and the eyepiece block 3, the engaging projecting portion 11 of the objective housing 1a is placed in the engaging recess portion 13 of the eyepiece housing 3a, and, in addition, the engaging pins 14 are inserted into the slots 12a formed in the flange portion 12. Slots 13a are transverse to the optical axis, and they match the screw holes 11a of the engaging recess portion 13. This means that the set screws 6 are inserted into the slots 13a and are then received in the screw holes 11a. The length of the engaging recess 13 in a direction transverse to the optical axis is longer than the length of the engaging projecting portion 11 in the same direction, such that the position of the engaging projecting portion 11 can be changed in the engaging recess portion 13.

In addition, before placing the engaging projecting portion 11 in the engaging recess portion 13, a spacer 7 may be, when necessary, interposed between the engaging projecting portion 11 and the engaging recess portion 13.

Figure 3:
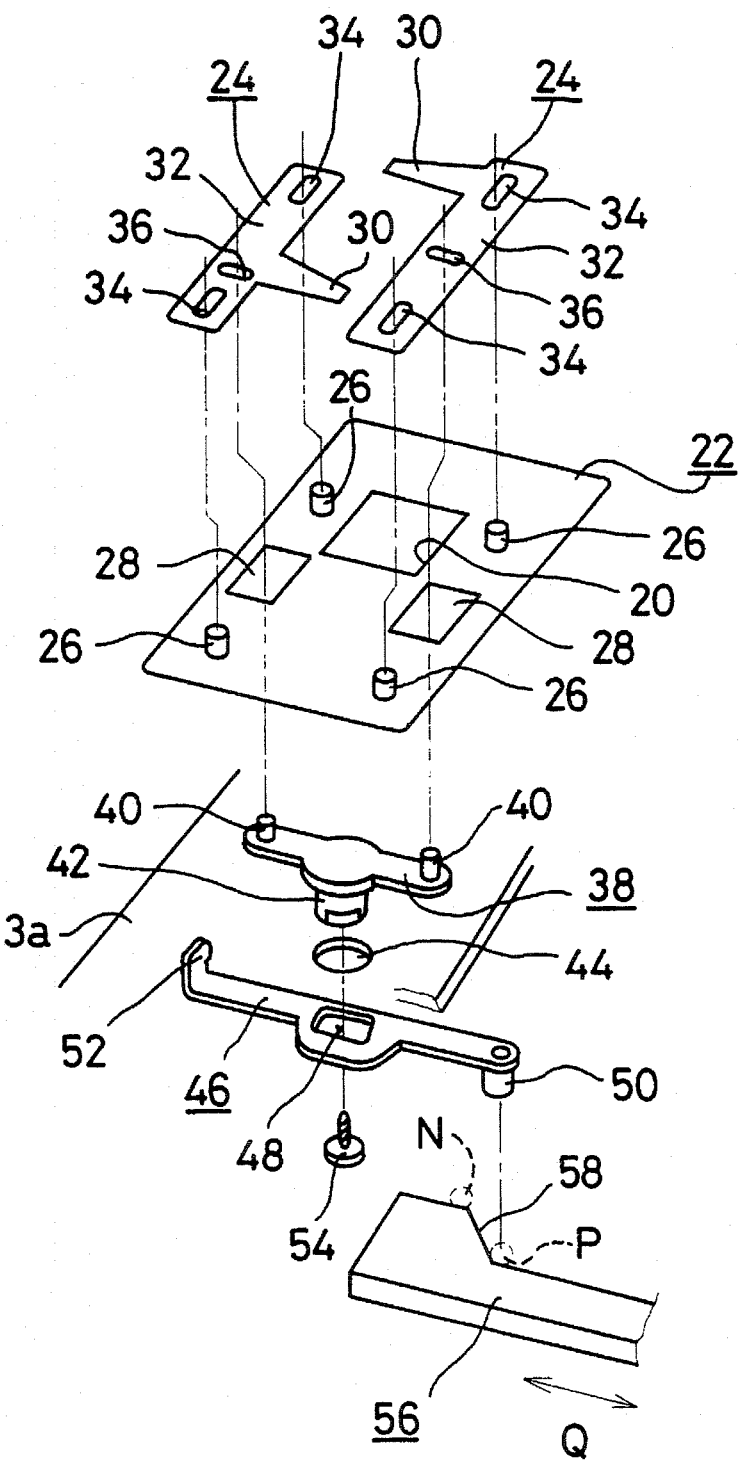
FIG. 3 is an exploded perspective view schematically illustrating component parts of field frames for normal photography and for panoramic photography.

On the other hand, a field frame having the structure shown in FIG. 3 is placed near to and facing the focal plane 4e of the prism 4b, in which the field frame is enlarged together with the image which can be viewed on the focal plane 4e by the eyepiece 5. The field frame is formed by a field frame plate 22 having a normal field frame 20 for normal photography mode and a pair of panoramic field frame members 24 for panoramic mode. The normal field frame 20 is an opening which is formed in the field frame plate 22 by removing a rectangular portion thereof offset from the center of the field frame plate 22. Four engaging pins 26 are provided such that they appropriately project from the four corners of the field frame plate 22, in which at least a pair of these engaging pins 26 is disposed on opposite sides of the normal field frame 20, and the other pair is disposed where the normal field frame 20 is not formed in the field frame plate 22. Openings 28 are formed between each pair of engaging pins 26 on each side of plate 22.

The above-described panoramic field frame members 24 are formed from substantially L-shaped thin plates. The substantially L-shaped thin plates combined form a substantially rectangular shape. The combined L-shaped thin plates have one pair of arms facing each other that form frame portions of panoramic field frames, defined as panoramic frames 30. The other pair of arms 32 of the L-shaped thin plates have a pair of slots 34 formed therein in the longitudinal direction of the other pair of arms 32. In addition, engaging holes 36 are formed near the center of the other arm pair 32 and are elongated in the longitudinal direction defined as the direction of the width of the other arm pair 32. Furthermore, when the panoramic field frame members 24 are disposed in the focal plane 4e and superimposed on the field frame plate 22, the engaging pins 26 projecting out of the field frame plate 22 are inserted through the slots 34, so that the panoramic field frame members 24 are slidably retained on the field frame plate 22. In addition, the engaging holes 36 are so disposed that they match the openings 28 of the field frame plate 22.

A field frame changeover lever 38 is provided on the side of plate 22 opposite the surface having retained thereon the panoramic field frame members 24. Engaging pins 40 are carried by both ends of the field frame changeover lever 38, which pins are inserted in openings 28 formed in the field frame plate 22. These pins are inserted in the openings 28 and then inserted in the engaging holes 36 formed in the panoramic field frame members 24. Near the central portion of the field frame changeover lever 38, there is provided a shaft 42. The end portion of the shaft 42 has a non-circular section. The shaft 42 is inserted through a hole 44 formed in the eyepiece housing or partition 3a of the finder, and its end projects out of or through the eyepiece housing or partition 3a. Therefore, at least the field frame plate 22 and the panoramic field frame members 24 and the field frame changeover lever 38, are placed inside the eyepiece housing 3a.

A finder drive lever 48 is provided e.g. outside the finder. The non-circular end portion of the shaft 42 of the field frame changeover lever 38 is received in a non-circular receiving hole 48 formed near the central portion of this finder drive lever 46. One end of the finder drive lever 46 projects away from the finder and rotatably supports a roller 50. The other end of the finder drive lever 46 is suitably bent to form an engaging arm 52. A return spring (not illustrated) is hung between the engaging arm 52 and the camera body with the restoring force of the return spring so directed that the finder drive lever 46 is rotated in the direction such that roller 50 presses against a cam surface 58 of a photography mode driver lever 56, as will be described later. With the shaft 42 of the field frame changeover lever 38 inserted in the receiving hole 48, a locking screw 54 is inserted into the end of the shaft 42, so that the field frame changeover lever 38 and the finder drive lever 46 cannot separate.

The finder drive lever 46 has its roller 50 thus operatively connected to the photography mode changeover lever 56. As shown, for example, in FIG. 3, the cam surface 58 is formed on one side of the photography mode changeover lever 56. The operator may slide the lever from the outside of the camera in the direction of the arrow Q, for example, by using an exposed knob (not illustrated). The finder drive mechanism comprises the above-described finder driver lever 46, photography mode changeover lever 56, a knob, and the like. Interlocking with the operation of the photography mode changeover lever 56, the photography mode of the camera may be switched between the normal photography mode and the panoramic photography mode.

Parallax correction of the camera viewfinder according to the present invention having the above-described structure will now be described.

The above-described objective block 1 having retained therein an objective lens 2 is fixed to a predetermined location on the camera body by using screws or the like. With the objective block 1 fixed in place, the drive mechanism of the objective lens 2 is linked to a drive member based on the zooming operation of the taking lens (not shown). This allows interlocking with the zooming operation of the taking lens, thereby moving at least a portion of the objective lens, so that the finder is driven based on zooming. To the rear of the objective block 1 is connected the above-described eyepiece block 3 which has therein the erecting optical system 4 and the eyepiece 5, and the field frame. The engaging recess portion, 13 of the eyepiece housing 3a is placed over the engaging projecting portion 11 of the objective housing 1a so that the engaging projecting portion 11 is fitted into the engaging recess portion 13, and the engaging pins 14 projecting down from the eyepiece housing 3a are inserted into the slots 12a formed in the flange portion 12 of the objective housing 1a. A spacer 7 of the right thickness is appropriately interposed between the engaging projecting portion 11 and the engaging recess portion 13. The set screws 6 inserted into the slots 13a formed in the engaging recess portion 13 are fitted into the screw holes 11a formed in the engaging projecting portion 11.

With the focal points of the taking optical system and the finder optical system focused on a predetermined test chart or the like, parallax existing between the taking optical system and the finder optical system is corrected. The objective block 1 and the eyepiece block 3 are joined by engaging the engaging projecting portion 11 and the engaging recess portion 13, and by engaging the slots 12a with the engaging pins 14. Since the set screws 6 which secure the engaging recess portion 13 and the engaging projecting portion 11 are inserted through the slots 13a in the engaging recess portion 13, the eyepiece block 3 is movable in a direction transverse to the optical axis relative to the objective block 1. In addition, since a spacer 7 is, when necessary, interposed between the engaging projecting portion 11 and the engaging recess portion 13, changing the thickness of the spacer 7 allows the finder optical axis to be moved up and down. Accordingly, parallax correction may be carried out by moving the eyepiece block 3 in a direction transverse to the optical axis relative to the objective block 3, or by changing the spacer thickness or the number of spacers.

With the optical axis of the finder optical system and the taking optical system in a specified relationship, thereby allowing appropriate correction of parallax, the set screws 6 are tightened to secure the eyepiece block 3 onto the eyepiece block 1.

Next, there will be described switching operations between the normal field frame and the panoramic field frame of the finder of the present invention having the aforementioned structure.

In an assembled finder, the panoramic field frame members 24 and the field frame plate 22 are placed near the focal plane 4e of the prism 4b, and the panoramic field frame members 24 are retained on the field frame plate 22 by inserting the engaging pins 26 projecting from the field frame plate 22 into the slots 34 formed in the panoramic field frame members 24. It is preferable to retain prism 4b on the field frame plate 22 by fitting the front ends of the engaging pins 26 into a recess formed in the above-described prism 4b The field frame changeover 38 is disposed on the surface opposite the prism 4b retained on the field frame plate 22, and the engaging pins 40 on the field frame changeover lever 38, which are inserted into the openings 28 in the field frame plate 22, are inserted into the engaging holes 36 in the panoramic field frame members 24. The shaft 42 of the field frame changeover lever 38 passes through the opening 44 in the eyepiece housing 3a of the finder, such that it projects outside the eyepiece housing 3a, and such that the non-circular end portion of the shaft 42 is received in non-circular opening 48. Or the shaft 42 can pass through an opening through a suitably-apertured partition 3a across the interior of the eyepiece housing. The field frame changeover lever 38 and the finder drive lever 46 are thus integrally rotatably joined, such that when the locking screw 54 is fitted into the end of the shaft 42 and tightened, the finder drive lever 46 cannot separate from the field frame changeover lever 38.

In performing the above-described parallax correction for the assembled eyepiece housing 3a, securing it to the objective housing 1a allows the roller 50 of the finder drive lever 46 to abut the cam surface 58 of the photography mode changeover lever 56 provided on the camera body. This also pushes the cam surface 58 against the restoring force of the return spring.

When the camera is in normal photography mode, the roller 50 of the finder drive lever 46 abuts the end of the cam surface 58 as shown at N in FIG. 3. In this condition, the field frame drive lever 38 is positioned so as to expose the normal field frame 20 on the field frame plate 22, i.e., the normal field frame 20 is open.

With the finder assembled in this way, observing the subject means observing the light of the image which passes through the objective lens 2 and is focused in the focal plane 4e. The field frame is provided near the focal plane 4e, and the foregoing image passes through the field frame. The image exits the prism 4b and its left and right sides are reversed by the roof mirror 4c, causing the top and bottom of the image to be inverted by the mirror 4d to form an erected non-reversed image. The resulting image is enlarged along with the field frame by means of the eyepiece 5 for observation.

The photography mode is switched to the panoramic photography mode by sliding the photography mode changeover lever 56 to the left, as shown in FIG. 3. This allows the roller 50 to move as a result of the restoring force of the return spring (not shown), so that it abuts the center portion of the cam surface 58, shown in FIG. 3 at P. This means that the finder drive lever 46 and the field frame changeover lever 38 both rotate clockwise in FIG. 3. The rotation of the field frame changeover lever 38 causes the panoramic field frame members 24 to be guided by the engaging pins 26, so that the panoramic frames 30 each comprising an L-shaped arm are slid and moved toward each other. Sliding the panoramic field frame members 24 causes the panoramic frames 30 to encroach on the normal field frame 20 on the field frame plate 22, thereby narrowing the field frame partially to form a panoramic field frame. Accordingly, with the finder assembled in this way, when the subject is observed, the panoramic field frame along with the image brought together in the panoramic field frame are observed, thereby allowing panoramic photography.

The structure minimizes entry of dust and the like into the finder interior. This is because the structure comprising the field frame plate 22, the panoramic field frame members 24, and the field frame changeover lever 38, are disposed in the eyepiece block 3; and the finder drive lever 46 is disposed outside the eyepiece block 3, the shaft 42 being sufficiently long for this purpose. Also, only the finder drive lever 46 and the field frame changeover lever 38 are linked by means of the shaft 42 passing through opening 44 formed in the eyepiece housing 3a of the finder.

The present embodiment has been described with reference to a zoom finder in a camera having a zoom device. The finder may also be a fixed type having a constant magnifying power.

As described above, according to the present invention, there is provided a parallax correction method in which the finder is divided into at least two component parts, an objective block and an eyepiece block, and these blocks are movable relative to each other transversely of the finder optical axis, thus allowing one of the blocks to move with respect to the other block, to correct parallax.

Since the above-described blocks may be moved by any amount, parallax correction can be carried out in accordance with the finders. Accordingly, differences in parallax caused by errors in manufacturing finder component parts may be corrected in accordance with the differences in the finders.

Since the structure allows separation of the component parts of the finder, dust may be easily cleaned away and removed by disassembling the finder, when dust and the like enters the finder optical system and makes the object difficult to observe.

On the other hand, the structure allows dust to enter the finder interior only through the openings, thereby minimizing the entry of dust. Accordingly, assembling the finder in an environment which is protected from dust, minimizes the possibility of making the finder difficult to see as a result of dust and the like. This is because the structure comprises a field frame plate and panoramic field frame members, and a field frame changeover lever in the finder interior; and a finder drive mechanism linked to the field frame changeover lever or a finder drive lever outside the finder. In addition, the field frame changeover lever is linked to the finder drive mechanism or the finder drive lever through the opening formed in the finder housing.

Furthermore, since the structure allows switching between normal photography field frames and panoramic photography field frames, the photographer can check the photography mode when observing the object with the finder, as well as framing the object within the field frame to photograph reliably the desired scene.

What is claimed is:

1. A camera having a finder which allows observation of an object by an optical system different from the taking optical system of the camera to determine the composition of a scene to be photographed, wherein said finder is divided into an objective block and an eyepiece block; said objective block including at least an objective lens; said eyepiece block including at least an eyepiece; said objective block and said eyepiece block being removable from each other; with one of said blocks when assembled being movable relative to each other in a direction transverse to an optical axis of the finder, said blocks together defining a closed finder housing to exclude dust from the inside of the finder;

wherein interengaging means on said objective block and said eyepiece block; said interengaging means comprising slots and engaging pins which allow said objective block and said eyepiece block to engage with each other while moving relative to each other transversely of said optical axis of said finder;

wherein a removable spacer adapted to be sandwiched between an engaging projecting portion and a recess on respective ones of said blocks, so that by changing the thickness of said spacer said objective block and said eyepiece block may be adjusted in a direction transversely of the optical axis of the finder.

2. A camera having a finder which allows observation of an object by an optical system different from the taking optical system of the camera to determine the composition of a scene to be photographed, wherein said finder is divided into an objective block and an eyepiece block; said objective block including at least an objective lens; said eyepiece block including at least an eyepiece; said objective block and said eyepiece block being removable from each other; with one of said blocks when assembled being movable relative to each other in a direction transverse to an optical axis of the finder, said blocks together defining a closed finder housing to exclude dust from the inside of the finder;

wherein a removable spacer is adapted to be sandwiched between an engaging projecting portion and a recess on respective ones of said blocks, so that by changing the thickness of said spacer said objective block and said eyepiece block may be adjusted in a direction transversely of the optical axis of the finder.

* * * * *